United States Patent Office 3,053,884
Patented Sept. 11, 1962

3,053,884
ESTERIFICATION BY MEANS OF METHANE DI-
SULFONIC ACID AND METHANE TRISUL-
FONIC ACID CATALYSTS
George P. Touey and Rex H. Goins, Kingsport, Tenn.,
assignors to Eastman Kodak Company, Rochester,
N.Y., a corporation of New Jersey
No Drawing. Filed Oct. 9, 1959, Ser. No. 845,336
8 Claims. (Cl. 260—475)

This invention relates to a process of making organic esters by the esterification of alcohols with organic acids or their anhydrides. More particularly, it relates to such esterification in the presence of improved catalysts.

Strong acids such as hydrochloric acid, phosphoric acid, sulfuric acid, alkane monosulfonic acids, and p-toluene sulfonic acids, are known esterification catalysts. Of these, sulfuric acid has been the most commonly used commercially. It is cheap, relatively noncorrosive toward stainless steel equipment, and quite satisfactory in many cases.

However, esters which are to be used as plasticizers for cellulose esters or synthetic resins must be particularly free of discoloration and must have good heat stability, and when sulfuric acid is used as the catalyst in making esters, considerable discoloration is often encountered due to the strong dehydrating action of the catalyst on the reactants and the ester at the high temperatures involved. Also, esters made with sulfuric acid as the catalyst often exhibit poor heat stability due to traces of combined sulfate groups in the products. To eliminate such problems, expensive treatments to remove color and improve the heat stability of the plasticizer are often required.

Phosphoric acid, although known to be a relatively non-corrosive acid, also has the disadvantage of being a combining catalyst which introduces phosphorus impurities in the final product. Also, phosphoric acid is considerably less active than sulfuric acid as a catalyst in producing plasticizer type organic acid esters. Hydrochloric acid is too volatile, and high corrosive. Alkane monosulfonic acids and p-toluene sulfonic acid, being essentially non-combining acids, are an improvement over sulfuric acid and phosphoric acid in this respect. Also, they are considerably less corrosive than hydrochloric acid. However, these acids leave much to be desired in terms of their potency as esterification catalysts when compared with sulfuric acid.

We have found that methane disulfonic acid (methionic acid) and methane trisulfonic acid, while retaining the advantageous properties of the alkane monosulfonic acids and p-toluene sulfonic acid, give improved esterification rates and increased conversion and yields as compared to these acids, and even as compared to sulfuric acid. They are effective at very low catalyst concentrations, and they do not leave undesirable mineral acid residues in the final product.

The amount of catalyst required depends on such variables as the types of alcohol and acid (or acid anhydride) being esterified, and whether or not an azeotroping agent, such, for example, as toluene or xylene, is added to the reaction mixture to remove the water formed. Regardless of such conditions, however, the effective concentration limits of catalyst seem to be between 0.01% and 1.0%, based on the weight of the acid or anhydride being esterified. The preferred range of catalyst concentration is 0.025% to 0.5%.

The types of alcohols and acids which can be esterified by these catalysts vary over a wide range. The alcohol can be aliphatic or aromatic in structure. Also, it can be a mono-, di-, or polyhydroxy alcohol, such as the straight and branched chain aliphatic alcohols, the glycols, glycerine, benzyl alcohol, alkylene glycol monoalkyl ethers, mono- and di-glycerides, cyclo-hexanols, etc. In the case of some of the lower-boiling alcohols, such as butyl or isobutyl alcohol, for example, it is not necessary to use an azeotroping agent, since the alcohol can function both as a diluent and as an azeotroping agent during the reaction. However, when both the alcohol and the acid or anhydride being esterified are high boiling compounds, it may be desirable to employ an azeotroping agent, such as toluene or xylene. The acid esterified may be an aromatic or aliphatic mono-, di- or polycarboxylic acid.

Our invention is illustrated, but not limited, by the following examples. In the examples, we have compared the effect of using the following acids as catalyst: methane disulfonic acid, methane trisulfonic acid, sulfuric acid, methane monosulfonic acid, p-toluene sulfonic acid, ethane-1,2-disulfonic acid. Sulfuric acid, methane monosulfonic acid, and p-toluene sulfonic acid are known esterification catalysts. Ethane-1,2-disulfonic acid was tested in order to see whether the presence of two sulfonic acid groups in one molecule would always give an improved catalyst, as compared to sulfuric acid. The examples show that this is not the case.

The method of operation in the examples is as follows, except where otherwise stated:

The acid or acid anhydride to be esterified, an excess of the alcohol to be esterified, and the desired amount of catalyst are charged to a distilling vessel attached to a fractionating column approximately equal to 30 theoretical plates, operating under atmospheric pressure. The column is equipped with a suitable condenser and a Dean-Stark trap for collecting and removing the water of reaction from the reflux. The reaction rate is followed by determining the acidity of the reaction mixture. When the reaction is complete, the excess alcohol is stripped off under vacuum, residual acidity removed by a caustic wash, and the finished ester obtained by molecular distillation.

*Example 1.*—Two moles (296 grams) of phthalic anhydride, 5 moles (370 grams) of butyl alcohol, and 0.8 gram of a 37% aqueous solution (0.1% catalyst based on the weight of the anhydride) of methane disulfonic acid were charged to the apparatus described above. The mixture was heated to reflux temperature, with an initial reflux liquid temperature of 128° C. The water formed was azeotropically removed by the refluxing alcohol, and was separated by stratification and removed from the system, the alcohol being returned to the distilling vessel. Free acid determinations were made periodically on the reaction mixture to follow the esterification rate. The amount of free phthalic acid remaining in the reaction mixture versus length of reaction time is listed in Table I. A total of 39.5 ml. of water was obtained, with the reflux temperature increasing to 151° C. at completion of the reaction. The five additional runs were carried out with the same amounts of alcohol and phthalic anhydride. The nature and amount of catalyst in each run was as follows:

| Run No. | Catalyst | Catalyst Concentration (Based on Anhydride), percent |
|---|---|---|
| 1 | Methane disulfonic acid | 0.1 |
| 2 | Methane trisulfonic acid | 0.1 |
| 3 | Sulfuric acid | 0.1 |
| 4 | Methane monosulfonic acid | 0.2 |
| 5 | p-Toluene sulfonic acid | 1.0 |
| 6 | Ethane-1,2-disulfonic acid | 0.2 |

In runs 2–6, the final reflux temperature was 150–

151° C., and the total water takeoff was between 36 and 37 ml.

After each run, the mixture was stripped of unreacted alcohol under vacuum, washed with dilute aqueous NaOH, and distilled in a molecular still. The following stability data were obtained on the refined esters.

TABLE I
*Reaction Rates in the Preparation of Dibutyl Phthalate Using Acid Catalysts as Shown Above*

| Reflux Time (Hours) | Percent Phthalic Acid In The Product | | | | | |
|---|---|---|---|---|---|---|
| | $CH_2(SO_3H)_2$ | $CH(SO_3H)_3$ | $H_2SO_4$ | $CH_3SO_3H$ | $CH_3C_6H_4SO_3H$ | $HO_3SCH_2CH_2SO_3H$ |
| 1 | 13.4 | 13.8 | 14.5 | 16.0 | 16.2 | 15.5 |
| 2 | 6.5 | 6.9 | 7.9 | 11.0 | 12.0 | 9.0 |
| 3 | 1.9 | 2.3 | 3.8 | 6.3 | 7.0 | 5.0 |
| 4 | 0.46 | 0.95 | 2.2 | | | 2.8 |
| 5 | 0.15 | 0.35 | | 3.1 | 4.0 | 1.5 |
| 6 | 0.07 | 0.10 | 0.60 | 2.2 | 2.8 | 1.0 |
| 7 | 0.02 | 0.03 | 0.35 | 1.6 | 2.0 | 0.85 |

These results show that both the methane disulfonic acid and the methane trisulfonic acid were superior to the other catalysts tested in accelerating the esterification rate. Sulfuric acid, although more effective than the others, was inferior to the catalysts of this invention. The crude product obtained from the sulfuric acid catalyzed reaction had a light tan coloration, whereas the products of all of the sulfonic acid catalyzed runs had only a slight yellow tinge.

*Example 2.*—One mole of adipic acid (146 grams) and 5 moles of n-octyl alcohol (650 grams) were refluxed for 10 hours, by the method described in Example 1, the water formed being removed in the same manner. The same catalysts were used as in Example 1. The amount of catalyst used, and the percent adipic acid remaining in the esterification mixture at the end of the 10-hour refluxing, are shown in Table II.

TABLE II
*Esterification of n-Octyl Alcohol With Adipic Acid Using Acid Catalysts as Shown*

| Acid Catalyst | Percent Catalyst [1] | Percent Adipic Acid in Mixture After 10-hr. Reflux |
|---|---|---|
| $CH_2(SO_3H)_2$ | 0.05 | 0.04 |
| $CH(SO_3H)_3$ | 0.05 | 0.07 |
| $H_2SO_4$ | 0.05 | 0.50 |
| $CH_3SO_3H$ | 0.10 | 1.90 |
| $CH_3.C_6H_4.SO_3H$ | 0.50 | 2.65 |
| $HO_3SCH_2CH_2SO_3H$ | 0.10 | 1.20 |

[1] Based on the weight of the adipic acid.

The crude product of the sulfuric acid catalyzed reaction had a light tan coloration, while the crude products of the sulfonic acid catalyzed reaction were light yellow.

*Example 3.*—Three additional preparations of dibutyl phthalate were carried out as described in Example 1. In the first of these runs, the catalyst was 0.025% methane disulfonic acid; in the second it was 0.025% methane trisulfonic acid, and in the third it was 0.05% sulfuric acid. All of these catalyst concentrations were based on the weight of the phthalic anhydride.

| Catalyst | Reaction Time, hrs. | Percent Phthalic Acid in Crude Product | Ml. of $H_2O$ Removed |
|---|---|---|---|
| $CH_2(SO_3H)_2$ | 10 | 0.61 | 37.5 |
| $CH(SO_3H)_3$ | 10 | 0.65 | 37.5 |
| $H_2SO_4$ | 10 | 0.75 | 38.0 |

| Catalyst employed | $CH_2(SO_3H)_2$ | $CH(SO_3H)_3$ | $H_2SO_4$ |
|---|---|---|---|
| Original color, APHA | 5 | 7 | 5 |
| Heat test color (2 hrs. at 220° C.), APHA | 25 | 30 | 70 |
| Filter paper test | 2 | 2 | 5½ |
| EAB color test | 100 | 125 | >400 |

The filter paper test and the EAB color test are described below.

These results show that it is possible to use methane disulfonic acid or methane trisulfonic acid at a much lower concentration than sulfuric acid, and yet maintain an esterification rate comparable to that obtained with sulfuric acid. This provides a marked improvement in product stability, probably due to less residual catalyst contamination and/or reduction of undesirable trace byproducts believed to be alkyl sulfates. These sulfates are very difficult to remove by conventional refining methods.

The next example illustrates how the sulfonic acids of our invention can improve the rate of esterification in esterifying a polyhydric alcohol with an acid in the presence of an azeotroping agent.

*Example 4.*—One mole of glycerol and 3.3 moles of 2-ethyl hexanoic acid were added to 200 ml. of toluene. This mixture was placed in a round-bottom flask equipped with a condenser and a Dean-Stark trap. Before the mixture was heated, 0.2% methane disulfonic acid (based on the weight of the 2-ethyl hexanoic acid) was added. The mixture was then refluxed for 5 hours. The amounts of water removed during this time are shown in Table III. Five additional runs were carried out with the same amounts of acid, alcohol and toluene in each run as shown above, but with the six different catalysts used in Examples 1 and 2.

TABLE III
*Esterification of Glycerol With 2-Ethyl Hexanoic Acid*

| Catalyst | Moles [1] $H_2O$ Removed in 4 hrs. at Reflux | Color of Crude Product |
|---|---|---|
| 0.2% $CH_2(SO_3H)_2$ | 2.9 | Pale yellow. |
| 0.2% $CH(SO_3H)_3$ | 2.8 | Do. |
| 0.2% $H_2SO_4$ | 2.4 | Light tan. |
| 0.3% $CH_3SO_3H$ | 2.1 | Pale yellow. |
| 1% $CH_3.C_6H.SO_3H$ | 2.0 | Do. |
| 0.3% $HO_3SCH_2CH_2SO_3H$ | 2.2 | Do. |

[1] Theory for completely esterified product = 3.0 moles $H_2O$.

The filter paper test and the EAB color test referred to above are carried out as follows.

FILTER PAPER TEST

A strip of Whatman No. 42 ashless filter paper approximately ¾ x 4 inches in size is submerged into the plasticizer sample contained in a 100 ml. low form Nessler tube. The sample is placed in a heat block maintained at about 210° C. for a period of one hour. The filter paper is removed from the tube, washed with acetone, dried, and compared to standards.

The standards are prepared by immersing a strip of starch-free filter paper into iodine solutions of various concentrations and holding for a period of 10 seconds.

| Normality of iodine: | Grading scale |
|---|---|
| Filter paper untreated with iodine | 1.0 |
| .0075 | 2.0 |
| .010 | 3.0 |
| .015 | 4.0 |
| .020 | 5.0 |
| ---- | [1] 6.0 |

[1] Charred black in color.

EAB COLOR TEST

A 15 gram sample of plasticizer is placed into an ignition tube (20 x 150 mm.) and then 5.0 grams of standard cellulose ester is added to the tube. The contents are mixed until a homogeneous slurry is obtained. The tube and contents are placed into a heat block at 220° C. for two hours and then removed and color-graded against standard colors.

STANDARDS

Standard cellulose ester—selected by Tenite Division of Tennessee Eastman Company from a normal batch of cellulose acetate-butyrate, 35.0–39.0% butyryl, 12.0–14.0% acetyl, 2% maximum propionyl; viscosity 18–28 seconds in 20% acetone dope at 20° C.

COLOR STANDARDS

The following amounts of dyes are dissolved in 50 ml. of C.P. methanol and then dissolved in 100 ml. of dimethyl phthalate to make up the stock solution. The stock solution is then further diluted with dimethyl phthalate to obtain the color standards.

0.20 gram Ciba Oil Soluble Yellow BB
0.20 gram Calcofast Spirit Orange R
0.022 gram General Alizarine Cyanine Green G. Ex. Conc.

| Color standard: | Percent stock solution |
|---|---|
| 400 | 100.00 |
| 300 | 75.00 |
| 200 | 50.00 |
| 100 | 25.00 |
| 75 | 18.75 |
| 50 | 12.50 |
| 40 | 10.00 |
| 30 | 7.50 |
| 20 | 5.00 |
| 15 | 3.75 |
| 10 | 2.50 |
| 8 | 2.0 |
| 6 | 1.5 |
| 4 | 1.00 |
| 2 | .05 |
| 0 | 0 |

We claim:

1. In the preparation of an ester by reacting with the aid of a catalyst an alcoholic reactant of the group consisting of saturated, aliphatic, mono- and polyhydroxy alcohols with an acidic reactant of the group consisting of phenyl dicarboxylic acids, saturated, aliphatic, carboxylic acids and their anhydrides, the improvement wherein said catalyst is a member of the group consisting of methane disulfonic acid and methane trisulfonic acid and is at a catalytically effective concentration, whereby said ester is obtained in a substantially colorless, heat stable condition.

2. In the preparation of an ester by reacting with the aid of an acid catalyst an alcoholic reactant of the group consisting of saturated, aliphatic, mono- and polyhydroxy alcohols with an acidic reactant of the group consisting of phenyl dicarboxylic acids, saturated, aliphatic, carboxylic acids and their anhydrides, the improvement wherein said catalyst is a member of the group consisting of methane disulfonic acid and methane trisulfonic acid and is at a concentration in a range from 0.01 to 1.0 percent by weight of the acidic reactant, whereby said ester is obtained in a substantially colorless, heat stable condition.

3. In the preparation of an ester by reacting with the aid of an acid catalyst an alcoholic reactant of the group consisting of saturated, aliphatic, mono- and polyhydroxy alcohols with an acidic reactant of the group consisting of phenyl dicarboxylic acids, saturated, aliphatic, carboxylic acids and their anhydrides, the improvement wherein said catalyst is a member of the group consisting of methane disulfonic acid and methane trisulfonic acid and is at a concentration in a range from 0.025% to 0.5% by weight of the acidic reactant, whereby said ester is obtained in a substantially colorless, heat stable condition.

4. In the preparation of an ester by reacting with the aid of an acid catalyst an alcoholic reactant of the group consisting of saturated, aliphatic, mono- and polyhydroxy alcohols with an acidic reactant of the group consisting of phenyl dicarboxylic acids, saturated, aliphatic, carboxylic acids and their anhydrides, the improvement wherein said catalyst is methane disulfonic acid at a concentration in a range from 0.025% to 0.5% by weight of the acidic reactant, whereby said ester is obtained in a substantially colorless, heat stable condition.

5. In the preparation of an ester by reacting with the aid of an acid catalyst an alcoholic reactant of the group consisting of saturated, aliphatic, mono- and polyhydroxy alcohols with an acidic reactant of the group consisting of phenyl dicarboxylic acids, saturated, aliphatic, carboxylic acids and their anhydrides, the improvement wherein said catalyst is methane trisulfonic acid at a concentration in a range from 0.025% to 0.5% by weight of the acidic reactant, whereby said ester is otbained in a substantially colorless, heat stable condition.

6. In the preparation of an ester, useful as a plasticizer, by refluxing butyl alcohol and phthalic anhydride with an acid catalyst, the improvement wherein said catalyst is a member of the group consisting of methane disulfonic acid and methane trisulfonic acid and is at a concentration in a range from about 0.025% to 0.5% by weight of the phthalic anhydride, whereby said ester is obtained in a substantially colorless, heat stable condition.

7. In the preparation of an ester, useful as a plasticizer, by refluxing n-octyl alcohol and adipic acid with an acid catalyst, the improvement wherein said catalyst is a member of the group consisting of methane disulfonic acid and methane trisulfonic acid and is at a concentration in a range from about 0.025% to 0.5% by weight of the adipic acid, whereby said ester is obtained in a substantially colorless, heat stable condition.

8. In the preparation of an ester, useful as a plasticizer, by refluxing glycerol and 2-ethyl hexanoic acid with an acid catalyst, the improvement wherein said catalyst is a member of the group consisting of methane disulfonic acid and methane trisulfonic acid and is at a concentration in a range from about 0.025% to 0.5% by weight of the 2-ethyl hexanoic acid, whereby said ester is obtained in a substantially colorless, heat stable condition.

References Cited in the file of this patent

UNITED STATES PATENTS 2,760,972    Joy    Aug. 28, 1956

OTHER REFERENCES

Faurote et al.: Ind. and Eng. Chem. 49, 189–191 (157).